US012670488B2

(12) United States Patent
Shevtsov et al.

(10) Patent No.: US 12,670,488 B2
(45) Date of Patent: Jun. 30, 2026

(54) POINT OF SALE ITEM PREDICTION AND VALIDATION

(71) Applicant: TOSHIBA GLOBAL COMMERCE SOLUTIONS, INC., Durham, NC (US)

(72) Inventors: Evgeny Shevtsov, Plano, TX (US); Andrei Khaitas, McKinney, TX (US); Srija Ganguly, Raleigh, NC (US); Ievgen Binkovskyi, Kharkov (UA); Viktor Danylchenko, Kharkov (UA); Viktor Ivakhno, Cary, NC (US); Tracy D. Cate, Durham, NC (US); Artem Nagoga, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 121 days.

(21) Appl. No.: 18/616,026

(22) Filed: Mar. 25, 2024

(65) Prior Publication Data

US 2025/0299174 A1 Sep. 25, 2025

(51) Int. Cl.
*G06Q 20/20* (2012.01)
*G07G 1/00* (2006.01)

(52) U.S. Cl.
CPC ......... *G06Q 20/208* (2013.01); *G07G 1/0063* (2013.01); *G07G 1/0072* (2013.01)

(58) Field of Classification Search
CPC ............... G06Q 20/208; G07G 1/0063; G07G 1/0072
See application file for complete search history.

(56) References Cited

U.S. PATENT DOCUMENTS

| | | | | |
|---|---|---|---|---|
| 7,909,248 | B1 * | 3/2011 | Goncalves | ........... G07G 1/0072 235/462.14 |
| 8,448,859 | B2 * | 5/2013 | Goncalves | ........... G07G 1/0054 235/383 |
| 8,452,660 | B2 | 5/2013 | Morris | |
| 9,679,327 | B2 | 6/2017 | Herring et al. | |
| 11,030,763 | B1 * | 6/2021 | Srivastava | .............. G06T 7/593 |
| 11,481,751 | B1 * | 10/2022 | Chaubard | .............. G06V 10/82 |

(Continued)

OTHER PUBLICATIONS

Rondán, Nicolás, et al. "Self-Checkout System Prototype for Point-of-Sale using Image Recognition with Deep Neural Networks." 2021 IEEE URUCON. IEEE, 2021. (Year: 2021).*

(Continued)

*Primary Examiner* — Nathan A Mitchell
(74) *Attorney, Agent, or Firm* — Patterson + Sheridan, LLP; Gero G. McClellan

(57) ABSTRACT

Techniques for predicting items for purchase at a point of sale (POS) system. These techniques include identifying one or more images, captured at a POS system, of one or more items for purchase. The techniques further include identifying a measured characteristic of the one or more items for purchase, the measured characteristic including at least one of: (i) a first weight measured using a weight sensor associated with the POS system or (ii) a footprint measured using one or more pressure or weight sensors associated with the POS system. The techniques further include predicting the items for purchase based on analyzing the one or more images using a machine learning (ML) model, and validating the predicted items for purchase using the measured characteristic.

20 Claims, 10 Drawing Sheets

(56) References Cited

U.S. PATENT DOCUMENTS

| | | | |
|---|---|---|---|
| 2016/0109281 A1* | 4/2016 | Herring | G06Q 30/0235 |
| | | | 177/1 |
| 2017/0076270 A1* | 3/2017 | Iizaka | G06Q 20/208 |
| 2018/0114413 A1* | 4/2018 | Tsuchimochi | G06V 20/00 |
| 2019/0057438 A1* | 2/2019 | Dhankhar | G01G 19/40 |
| 2019/0073657 A1 | 3/2019 | Singh | |
| 2019/0236362 A1* | 8/2019 | Srivastava | G06F 18/24137 |
| 2021/0157998 A1* | 5/2021 | Rodriguez | G06V 20/20 |
| 2021/0374373 A1* | 12/2021 | Astvatsaturov | G06K 7/1096 |
| 2022/0076227 A1* | 3/2022 | Shi | G07G 1/0072 |
| 2022/0076228 A1* | 3/2022 | Eger | G07G 1/0063 |
| 2022/0122151 A1 | 4/2022 | Bronicki | |
| 2023/0112491 A1* | 4/2023 | Dhankhar | G06Q 20/208 |
| | | | 348/150 |
| 2023/0124756 A1* | 4/2023 | Trim | G07G 1/0063 |
| | | | 705/23 |
| 2023/0297905 A1* | 9/2023 | Brosnan | G06Q 20/20 |
| 2024/0070637 A1* | 2/2024 | Slaughter | G06Q 20/3278 |
| 2024/0193573 A1* | 6/2024 | Ishida | G06T 7/62 |
| 2024/0220957 A1* | 7/2024 | Patil | G06T 7/194 |
| 2024/0242503 A1* | 7/2024 | Musiani | G07G 3/003 |

OTHER PUBLICATIONS

"Mean percentage error". Wikipedia article retrieved from <https://en.wikipedia.org/w/index.php?title=Mean_percentage_error&oldid=834166141>.Revision date Apr. 4, 2018. (Year: 2018).*

* cited by examiner

700

800

START

CAPTURE IMAGES OF ITEM ⟋ 802

PREDICT ITEM USING
CAPTURED IMAGES ⟋ 804

DETERMINE ITEM FOOTPRINT ⟋ 806

PREDICT ITEM USING FOOTPRINT ⟋ 808

VALIDATE PREDICTION
USING WEIGHT ⟋ 810

USE ITEM PREDICTION
AT POS SYSTEM ⟋ 812

END

POINT OF SALE ITEM PREDICTION AND VALIDATION

BACKGROUND

Point of sale (POS) terminals can be used by purchasers to purchase items for sale. For example, a retail establishment can include one or more self-checkout kiosks, to allow purchasers to purchase items. These self-checkout kiosks can serve as POS terminals, and can be used to identify items for purchaser and allow purchasers to purchase the identified items.

DETAILED DESCRIPTION

Figure 1A:
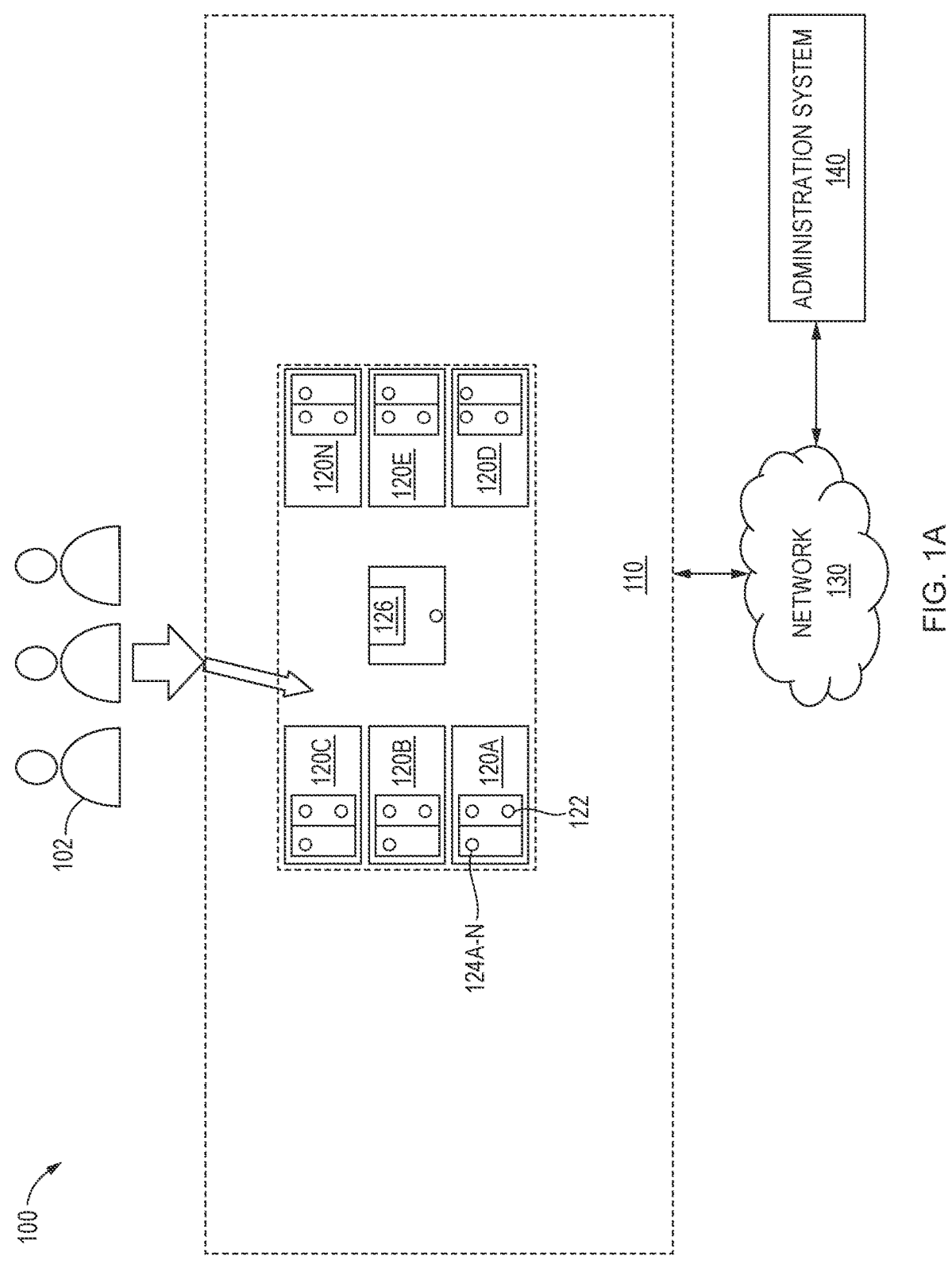
FIG. 1A illustrates an example checkout area with POS item prediction, according to one embodiment.

Identification of items at a POS terminal is a challenging problem. For example, a POS system can include one or more image capture devices (e.g., cameras) to capture images of items being purchased. Computer vision techniques (e.g., a suitable ML model) can be used to detect items visible to the camera. But computer vision has significant problems with identifying items not visible to the cameras (e.g., items stacked on top of one another) or that appear similar visually but are actually different (e.g., items available in different sizes).

For example, a purchaser may place a smaller item underneath a larger item in a POS terminal, such that the larger item is visible to cameras associated with the POS terminal but the smaller item is not visible. Computer vision that relies solely on cameras will not identify the item not visible to the cameras, leading to an incorrect prediction of items being purchased. Further, computer vision can misidentify identical products of different sizes. For example, a purchaser may attempt to purchase two cans of soda of the same brand, but of different sizes. The computer vision system may incorrectly identify these two cans as the identical item, or be unable to distinguish between the cans and so present to the purchaser a list of available sizes of cans (e.g., instead of correctly predicting the cans actually being purchased).

One or more techniques described below can alleviate one or more of these problems. For example, weight validation can be employed for item recognition (e.g., in addition to, or instead of, visual item recognition). In an embodiment, a POS system can include a scale, and a weight deviation can be identified between the actual recorded weight of items for purchase and a predicted weight (e.g., predicted using a suitable ML model). This weight deviation can be used to identify errors in item prediction, to enhance item prediction (e.g., along with visual item recognition), or for any other suitable technique. This is discussed further, below, with regard to FIGS. 3-7.

As another example, an item footprint can be employed for item recognition. In an embodiment, a POS terminal can include a weight or pressure sensor that identifies pressure points of an item for purchase. This can be used to generate a footprint for an item (e.g., a footprint for an item as it rests on a POS terminal). This footprint can be compared with a shape identified from captured images (e.g., captured from above the items for purchase) and used to predict an item for purchase, validate a purchase transaction, or both. This is discussed further, below, with regard to FIGS. 8-9. For example, a purchaser may be purchasing an item available in different sizes (e.g., a can of soda). Computer vision techniques can be used to identify a category of items (e.g., the brand and type of soda) but may not be able to predict the size. A footprint of the item, a weight of the item, or both, can be used to refine the prediction and select among the options (e.g., among the available sizes).

Advantages of Prediction Validation

As discussed above, in an embodiment weight, footprint, or both, can be used to validate or enhance a prediction for an item at a POS terminal. This has numerous technical advantages. For example, computer vision techniques may be insufficient to accurately predict items for purchase. This could be because some items are not visible in captured images (e.g., smaller items may be placed underneath larger items), because items may be available in visually-similar but different variations (e.g., different sizes for a give product), or for a variety of other options. Validating item prediction using weight, footprint, or both, can result in significantly more accurate predictions. This solves a technical problem inherent in computer vision techniques, by using additional data to supplement the computer vision analysis (e.g., weight, footprint, or both).

Further, one or more techniques discussed below can reduce the computational resources used for prediction, by reducing the resources used for computer vision prediction. For example, fewer training resources can be used to train the computer vision ML model because the computer vision ML model does not distinguish between items that can instead be distinguished based on footprint, weight, or both. As another example, inference using the computer vision ML model can be less computationally intensive because of the enhanced prediction offered by using footprint, weight, or both.

FIG. 1A illustrates an example checkout area 100 with POS item prediction, according to one embodiment. In an embodiment, the checkout area 100 relates to a retail store environment (e.g., a grocery store). This is merely one example, and the checkout area 100 can relate to any suitable environment.

One or more purchasers 102 use a checkout area 110 (e.g., to pay for purchases). In an embodiment, the checkout area 110 includes multiple point of sale (POS) systems 120A-N. For example, one of the purchasers 102 can use one of the POS systems 120A-N for self-checkout to purchase items.

The checkout area 110 further includes an employee station 126. For example, an employee (e.g., a retail employee) can use the employee station 126 to monitor the purchasers 102 and the POS systems 120A-N. Self-checkout is merely one example, and the POS systems 120A-N can be any suitable systems. For example, the POS system 120A can be an assisted checkout kiosk in which an employee assists a purchaser with checkout, or the checkout area 110 can be fully purchaser focused and not include employee assistance.

In an embodiment, each of the POS systems 120A-N includes components used by the purchaser for self-checkout. For example, the POS system 120A includes a scanner 122 and one or more sensors 124A-N (e.g., image capture devices, weight sensors, pressure sensors, or any other suitable sensors). In an embodiment, the purchaser 102 can use the scanner 122 to scan a UPC on an item. Further, in an embodiment, the scanner 122 can be integrated with, or replaced by, one or more of the sensors 124A-N. For example, the sensors 124A-N can include one or more image capture devices, and the image capture devices can be used to identify the UPC of an item. An example POS system (e.g., a POS system 120A) is discussed further, below, with regard to FIG. 1B.

In an embodiment, the POS system 120A can communicate with an administration system 140 using a network 130. The network 130 can be any suitable communication network, including a local area network (LAN), wide area network (WAN), cellular communication network, the Internet, or any other suitable communication network. The POS system 122A can communicate with the network 130 using any suitable network connection, including a wired connection (e.g., an Ethernet connection), a WiFi connection (e.g., an 802.11 connection), or a cellular connection.

In an embodiment, the POS system 120A can communicate with the administration system 140 to identify items scanned by a purchaser 102, and to perform other functions relating to self-checkout. The administration system 140 is discussed further, below, with regard to FIG. 2. For example, the POS system 120A can use the administration system 140 to identify an item (e.g., using the scanner 122, sensors 124A-N, or any combination thereof).

FIG. 1A illustrates the administration system 140 connected to the checkout area 110 using the communication network 130. The administration system 140 can reply to the POS system 120A with the identifying information for the item (e.g., alphanumeric UPC, PLU code, SKU code, price, textual description, or any other suitable information). This is merely an example, and the administration system 140 can be fully, or partially, maintained at a local computer accessible to the POS system 120A without using a network connection (e.g., maintained on the POS system 120A itself or in a local storage repository).

Further, in an embodiment, the sensors 124A-N are also components of the POS system 120A and can be used to identify the item that a purchaser is seeking to purchase. For example, the sensors 124A-N can include an image capture device used to capture one or more images of an item a purchaser 102 is seeking to purchase. The POS system 120A can transmit the images to the administration system 140 to identify the item depicted in the images. The administration system 140 can then use a suitable trained ML model to identify the items depicted in the image, and can reply to the POS system 120A with identification information for the identified item.

For example, the administration system 140 can transmit to the POS system 120A a code identifying the item (e.g., a PLU). The POS system 120A can use the code to lookup the item and present the item to the user (e.g., displaying an image relating to the item and a textual description relating to the item). In an embodiment, information about the item presented to the user (e.g., a stock image and textual description) is maintained at the POS system 120A. Alternatively, this information can be maintained at another suitable location. For example, the POS system 120A can communicate with any suitable storage location (e.g., a local storage location or a cloud storage location) to retrieve the information (e.g., using the identifying code for the item). Alternatively, or in addition, the administration system 140 can provide the information (e.g., the image and textual description) to the user.

Figure 1B:
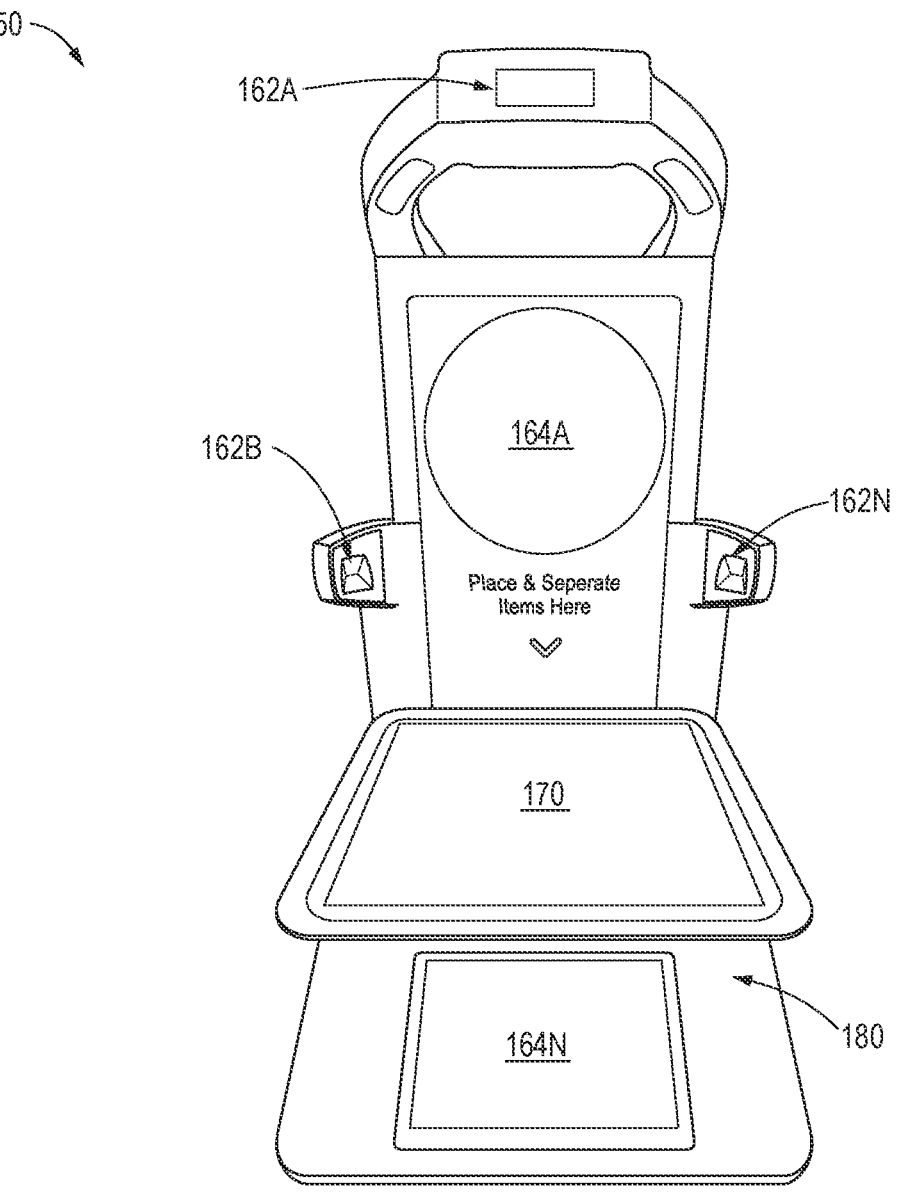
FIG. 1B illustrates an example POS kiosk for item prediction, according to one embodiment.

FIG. 1B illustrates an example POS kiosk 150 for item prediction, according to one embodiment. In an embodiment, the POS kiosk 150 provides one example of a POS system 120A-N illustrated in FIG. 1A. The POS kiosk 150 includes image capture devices 162A-N (e.g., cameras), one or more displays 164A-N, one more pads 170, and a payment sensor 180. As illustrated, the POS kiosk 150 includes three image capture devices 162A-N, two displays 164A-N, and one pad 170. This is merely an example, and the POS kiosk 150 can include any suitable number of image capture devices, displays, pads, and other components.

In an embodiment, the image capture devices 162A-N capture images of items for purchase (e.g., items placed on the pad 170). The POS kiosk 150 can use image recognition techniques (e.g., a suitable ML model), available UPC codes, and any other suitable information to identify the items for purchase. Further, in an embodiment the pad 170 can include, or be associated with, one or more sensors. These can include weight sensors, pressure sensors, or any other suitable sensors. For example, the pad 170 can be used for weight and footprint detection, as discussed below in relation to FIGS. 3-11.

Figure 2:
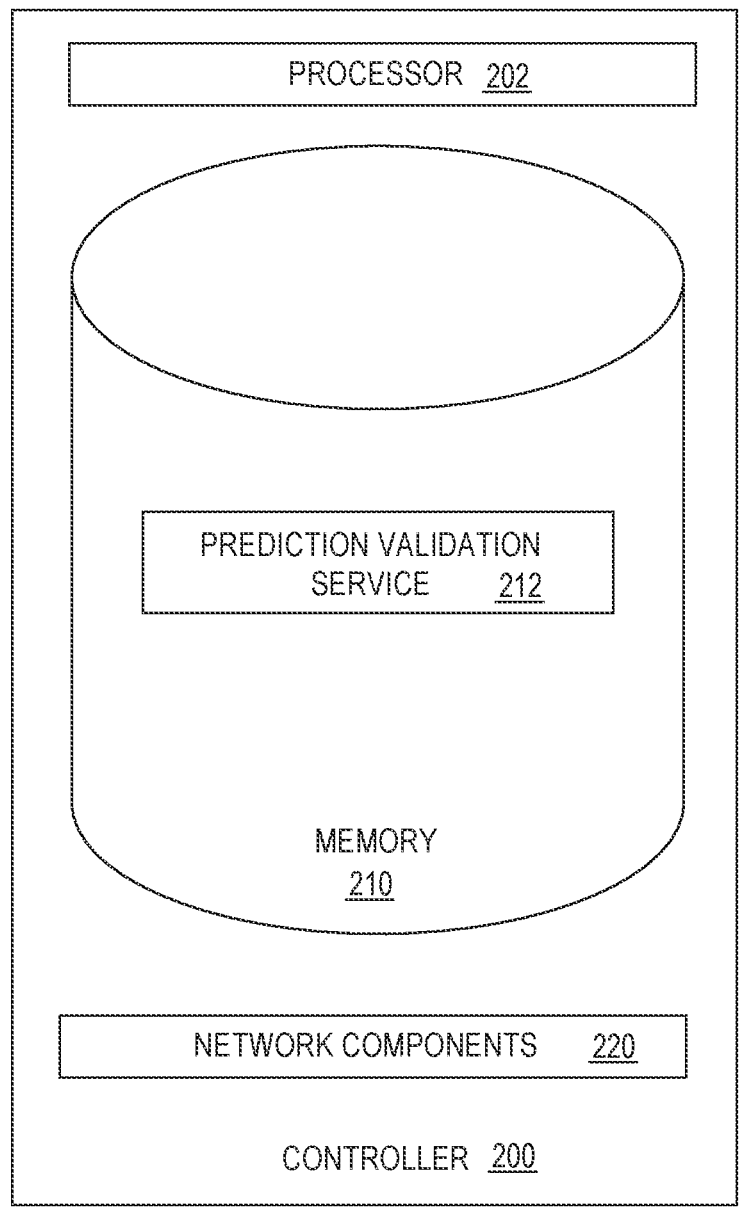
FIG. 2 is a block diagram illustrating a controller for POS item prediction, according to one embodiment.

FIG. 2 is a block diagram illustrating a controller 200 for POS item prediction, according to one embodiment. In an embodiment, the controller 200 is used for the administration system 140 illustrated in FIG. 1A. The controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components for the controller 200 to interface with a suitable communication network (e.g., the communication network 130 illustrated in FIG. 1A). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read-only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the prediction validation service 212 facilitates validation of predictions for item prediction (e.g., using weight, item footprint, or both). This is discussed further, below, with regard to FIGS. 3-9.

Although FIG. 2 depicts the prediction validation service 212 as located in the memory 210, that representation is merely provided as an illustration for clarity. More generally, the controller 200 may include one or more computing platforms, such as computer servers for example, which may be co-located, separated, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment. Further, in an embodiment the prediction validation service 212 may be divided across any suitable number of computing systems or compute nodes (e.g., in a cloud computing system), including fully or partially integrated within POS devices (e.g., the POS kiosk 150 illustrated in FIG. 1B).

Figure 3:
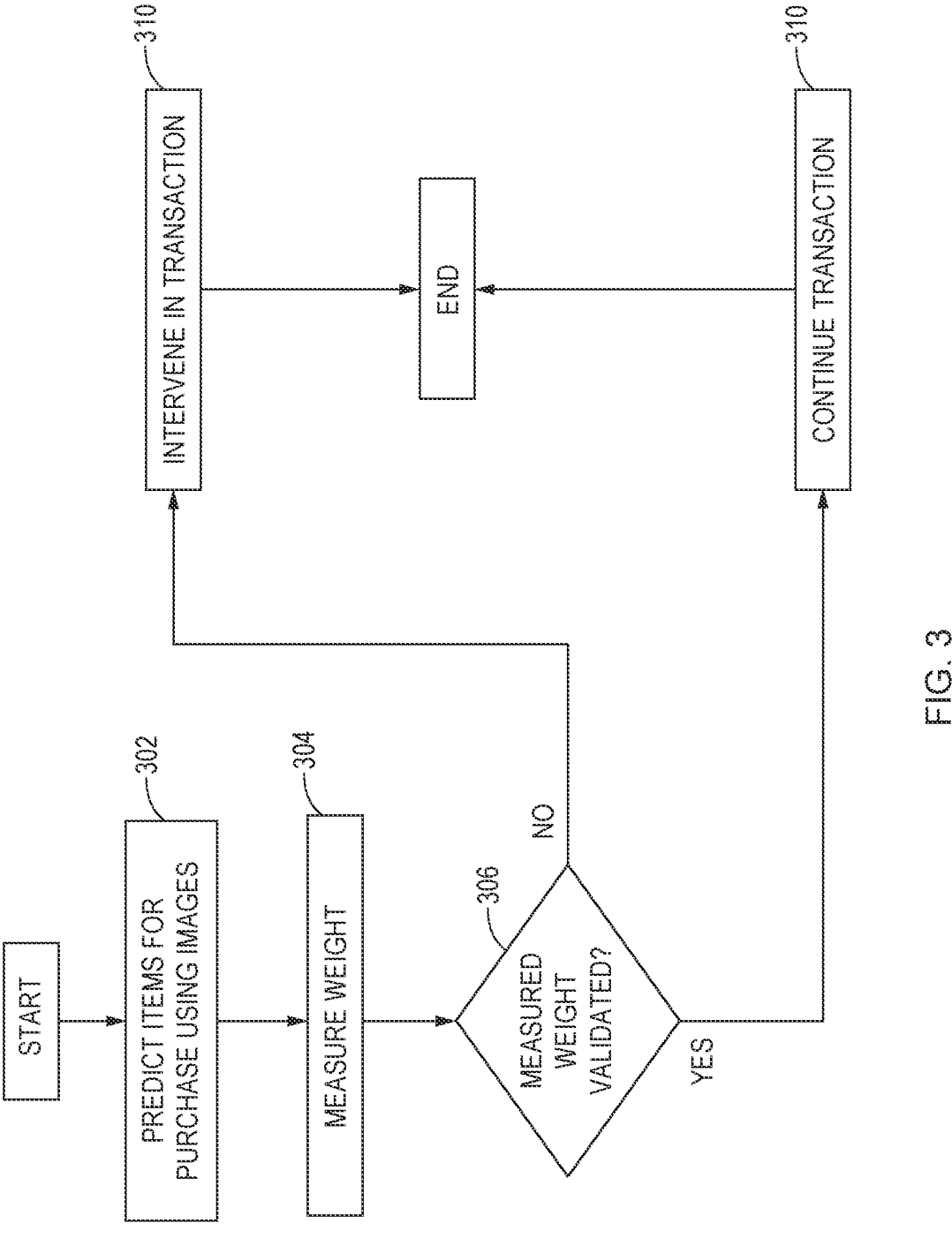
FIG. 3 is a flowchart illustrating POS item prediction using weight detection, according to one embodiment.

FIG. 3 is a flowchart 300 illustrating POS item prediction using weight detection, according to one embodiment. At block 302 a prediction validation service (e.g., the prediction validation service 212 illustrated in FIG. 2 or any other suitable service) predicts items for purchase using images. For example, a POS kiosk (e.g., the POS kiosk 150 illustrated in FIG. 1B) can include one or more image capture devices (e.g., cameras).

The image capture devices can capture images of items for purchase, and the prediction validation service can predict the items for purchase using the images. For example, the prediction validation service can use a suitable computer vision ML model (e.g., a deep neural network (DNN), support vector machine (SVM), or any other suitable ML model) to infer items for purchase from one or more images captured by the image capture devices. In an embodiment, where a POS kiosk includes multiple image capture devices, multiple images (e.g., captured from different angles) can be used together to predict the items for purchase.

At block 304, the prediction validation service measures the weight for the items for purchase. For example, the POS kiosk can include one or more weight sensors. The prediction validation service can measure the weight of items for purchase using the weight sensors. This is illustrated further, below, with regard to FIG. 4. In an embodiment, changes in the measured weight are captured over time. For example, an average weight (e.g., a mean or median weight) can be captured over a period of time. As another example, a maximum or minimum weight can be captured. These are merely examples, and any suitable weight measurement can be used.

In an embodiment, weight is merely one example of a characteristic that can be used to validate item prediction. For example, as discussed below in relation to FIGS. 8-9 an item footprint can be determined (e.g., using pressure or weight sensors) and used in place of, or in addition to, weight measurements. As another example a model of an item (e.g., a three dimensional model) can be generated (e.g., using image recognition, infrared imaging, lidar, radar, sonar, or any other suitable technique). The model of the item can be used to validate the prediction (e.g., instead of, or in addition to, weight or footprint).

At block 306, the prediction validation service validates the measured weight. In an embodiment, the prediction validation service predicts a weight for the identified items (e.g., using a suitable ML model) and determines whether the predicted weight falls within a deviation threshold of the measured weight. This is discussed further, below, with regard to FIG. 5.

If the prediction validation service validates the measured weight, the flow proceeds to block 308. At block 308, the prediction validation service continues with the transaction. For example, the prediction validation service can allow the purchaser to complete the transaction (e.g., provide payment and take the items for purchase). As another example, the prediction validation service can allow the purchaser to remove items from the POS kiosk and add additional items to the POS kiosk, to continue with the transaction (e.g., where a purchaser has placed a portion of their items at the POS kiosk). In an embodiment the POS kiosk can identify multiple items at once, as shown in FIG. 4, but the purchaser may still have more items for purchase than can be identified at one time at the POS kiosk.

Returning to block 306, if the prediction validation service fails to validate the measured weight (e.g., the deviation of the measured weight from the predicted weight exceeds a threshold), the flow proceeds to block 310. At block 310 the prediction validation service intervenes in the transaction. In an embodiment, the prediction validation service triggers an intervention action. For example, the prediction validation service can notify the purchaser that there is an apparent error, and can ask the purchaser to re-arrange or replace the items on the POS kiosk (e.g., where some items are hidden from view by image capture devices, as illustrated in FIG. 4). As another example, the prediction validation service can notify an employee or other personnel to assist with the transaction. As another example, the prediction validation service can attempt to correct the issue (e.g., by using alternative techniques for image recognition or item validation). These are merely examples, and the prediction validation service can take any suitable validation action.

Figure 4:
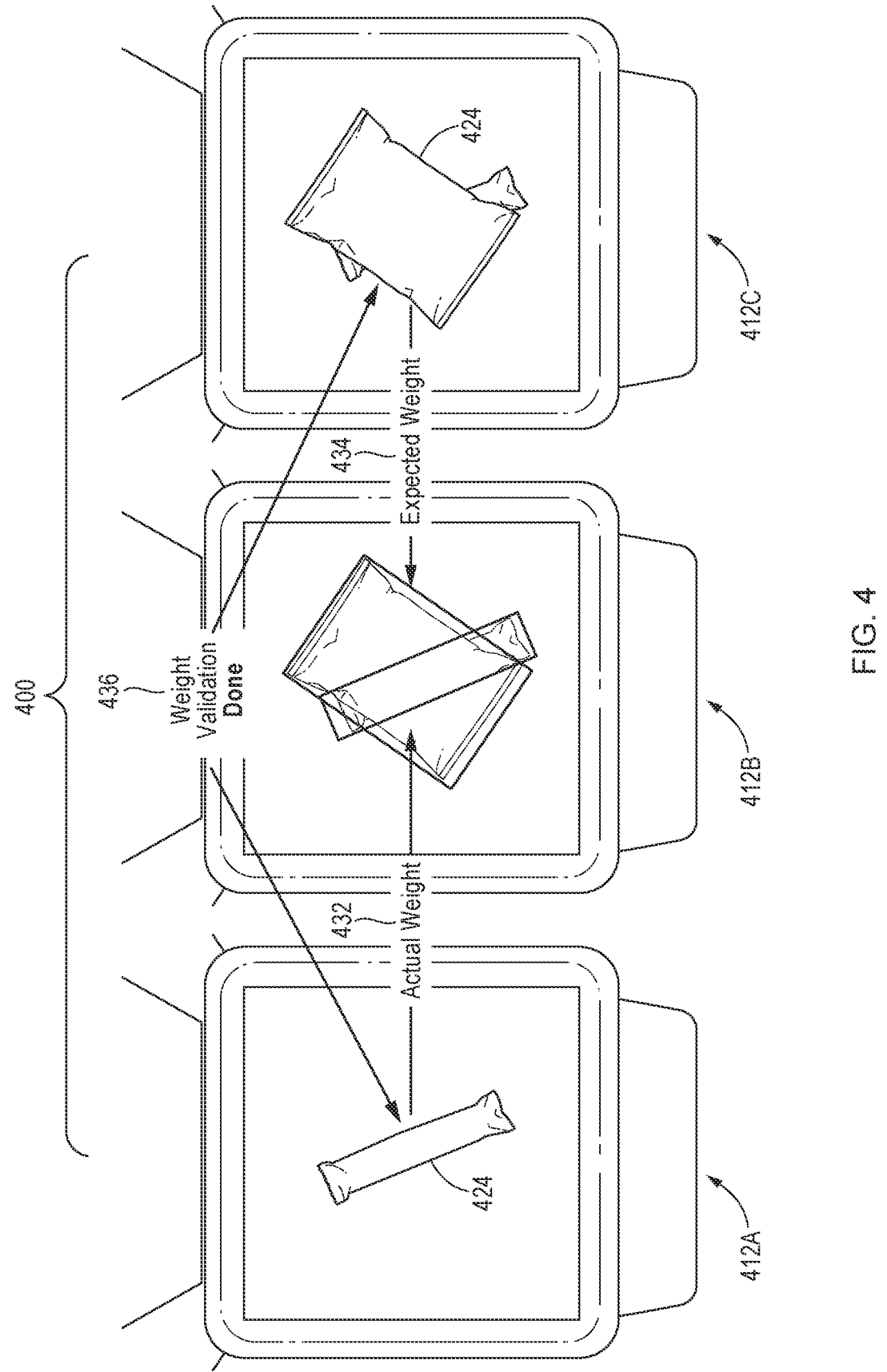
FIG. 4 illustrates use of a kiosk for POS item prediction using weight detection, according to one embodiment.

FIG. 4 illustrates use of a kiosk for POS item prediction using weight detection, according to one embodiment. In an embodiment, a POS kiosk 400 is used to purchase two items: a snack bag 424 and a candy bar 422. The POS kiosk 400 includes image capture devices and a pad (e.g., as illustrated in FIG. 1B). The items are placed on the POS kiosk pad such that the candy bar 422 (shown in a view 412B) is placed underneath the snack bag 424, and cannot be seen in images captured by image capture devices at POS kiosk. This is illustrated in a view 412C.

In an embodiment, a prediction validation service (e.g., the prediction validation service 212 illustrated in FIG. 2 or any other suitable service) follows the techniques illustrated above in relation to FIG. 3, and compares an expected weight 434 based on captured images (e.g., based on expecting one item to be present: the snack bag 424) with an actual measured weight 432 (e.g., including both the snack bag 424 and the candy bar 422, as illustrated in a view 412B). The prediction validation service performs weight validation 436, as discussed below in relation to FIG. 5, and determines that the expected weight and actual weight deviation exceeds a threshold. The prediction validation service then takes an intervention action (e.g., asking the purchaser to move the items so that they are flat on the pad and visible to the image capture devices).

Figure 5:
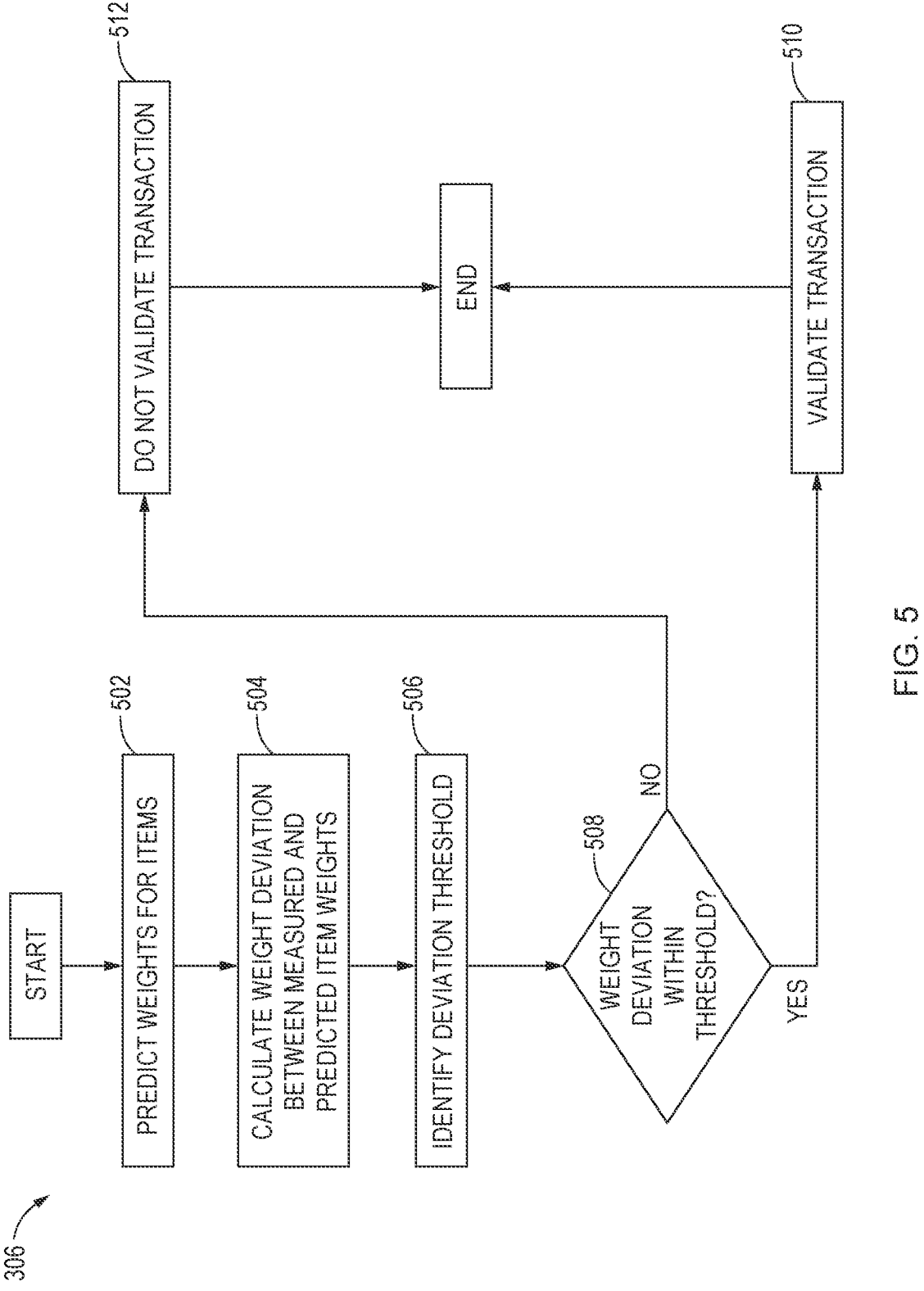
FIG. 5 is a flowchart illustrating weight validation for POS item prediction, according to one embodiment.

FIG. 5 is a flowchart illustrating weight validation for POS item prediction, according to one embodiment. In an embodiment, FIG. 5 corresponds with block 306 illustrated in FIG. 3. At block 502, a prediction validation service (e.g., the prediction validation service 212 illustrated in FIG. 2 or any other suitable service) predicts a weight for items for purchase.

In an embodiment, as discussed above in relation to block 302 illustrated in FIG. 3, the prediction validation service uses a suitable ML model to identify items for purchase (e.g., using images captured using one or more image capture devices at a POS kiosk). The prediction validation service can further use an ML model (e.g., a different ML model) to predict a weight for the identified items. In an embodiment, the predicted weight for items is inferred using an ML model (e.g., a trained ML model), and the prediction validation service can use captured images, identified items (e.g., identified using computer vision ML techniques as discussed above), or any other suitable data to predict the weight for items. This is discussed further, below, with regard to FIGS. 6-7.

At block 504, the prediction validation service calculates a weight deviation between the measured and predicted weights. In an embodiment, both the predicted weight and the measured weight are likely to be somewhat imprecise. Directly comparing predicted weight with measured weight would likely result in a large number of false positives, wasting computational resources (e.g., from inference using ML models) and harming the purchase experience. To reduce (or avoid) false positives, a weight deviation can be calculated. For example, the weight deviation can be calculated using the formula: |(measured weight−predicted weight)|÷(expected weight)−predicted number of items. This is merely an example, and any suitable formula or other technique (e.g., a suitable ML model or algorithmic technique) can be used to determine the weight deviation.

At block 506, the prediction validation service identifies a deviation threshold. In an embodiment, the prediction validation service validates the purchase so long as the weight deviation (e.g., calculated above at block 506) falls within a threshold. For example, a threshold of 2% could be used. Any weight deviation falling above 2% would not be validated, while a threshold within 2% would be validated. In an embodiment, the threshold can be provided by an administrator (e.g., using a suitable user interface), coded into the prediction validation service (e.g., hard coded), or determined dynamically (e.g., using a suitable ML model or algorithmic techniques).

At block 508, the prediction validation service determines whether the weight deviation falls within the deviation threshold. If so, the flow proceeds to block 510 and the prediction validation service validates the transaction. If not, the flow proceeds to block 512 and the prediction validation service does not validate the transaction.

Figure 6:
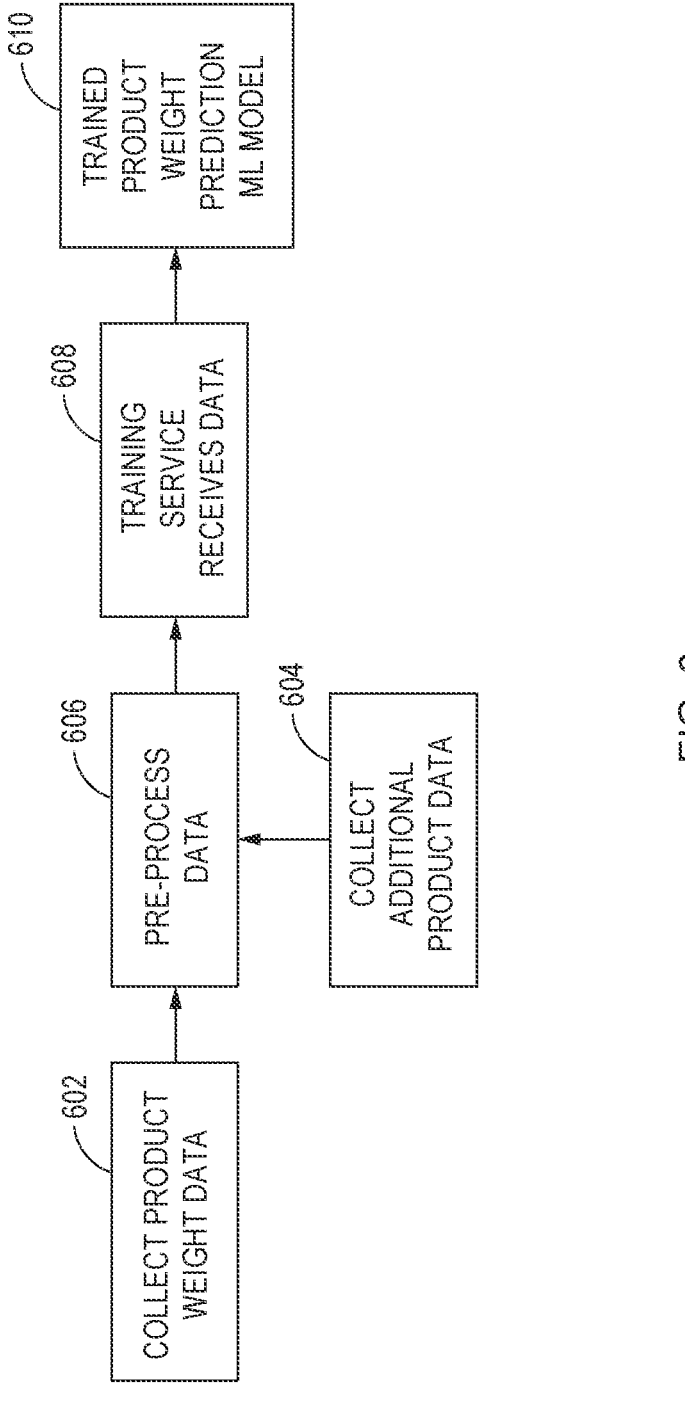
FIG. 6 is a flowchart illustrating training a product weight prediction machine learning (ML) model, according to one embodiment.

FIG. 6 is a flowchart 600 illustrating training a product weight prediction ML model, according to one embodiment. This is merely an example, and in an embodiment a suitable unsupervised technique could be used (e.g., without requiring training). At block 602, a training service (e.g., a human administrator or a software or hardware service) collects product weight data. For example, a prediction validation service (e.g., the prediction validation service 212 illustrated in FIG. 2) can be configured to act as a training service, and can collect product data reflecting the expected weights for various products.

At block 604, the training service (or other suitable service) pre-processes the collected product weight data. For example, the training service can create feature vectors reflecting the values of various features, for product with associated weight data. At block 606, the training service receives the feature vectors and uses them to train a trained product weight prediction ML model 610.

In an embodiment, at block 604 the training service also collects additional product data. For example, the training service can use UPC data or any other suitable data to further identify products. At block 606, the training service can also pre-process this additional product data. For example, the feature vectors corresponding to the product weight data can be further annotated using the additional product data. Alternatively, or in addition, additional feature vectors corresponding to the additional product data can be created. At block 608, the training service uses the pre-processed additional product data during training to generate the trained product weight prediction ML model 610.

In an embodiment, the pre-processing and training can be done as batch training. In this embodiment, the data is pre-processed at once (e.g., product weight data and additional product data), and provided to the training service at block 608. Alternatively, the pre-processing and training can be done in a streaming manner. In this embodiment, the data is streaming, and is continuously pre-processed and provided to the training service. For example, it can be desirable to take a streaming approach for scalability. The set of training data may be very large, so it may be desirable to pre-process the data, and provide it to the training service, in a streaming manner (e.g., to avoid computation and storage limitations). Further, in an embodiment, a federated learning approach could be used in which multiple entities contribute to training a shared model.

Figure 7:
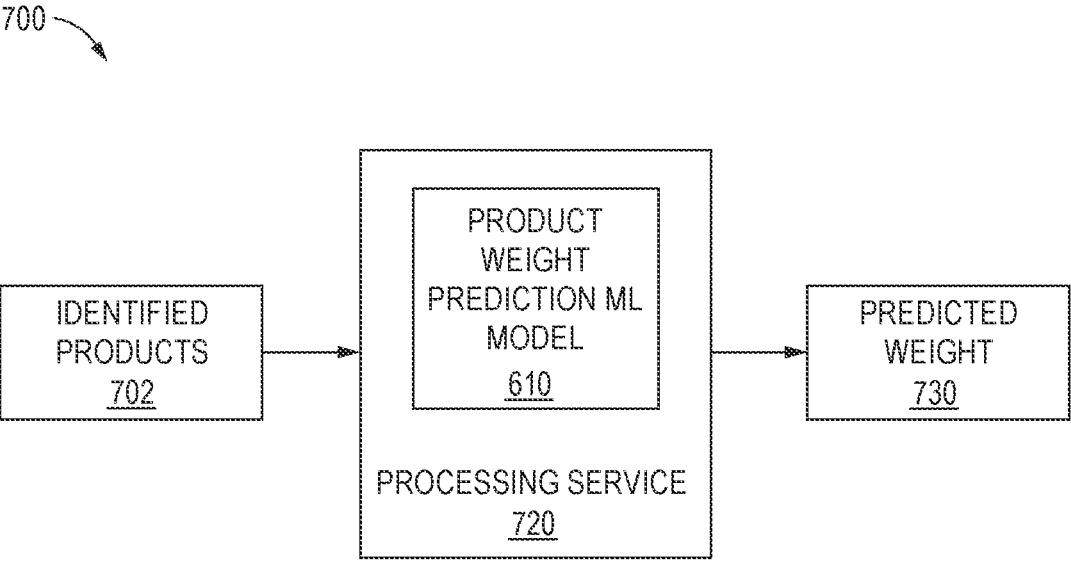
FIG. 7 is a flowchart illustrating inferring a product weight using an ML model, according to one embodiment.

FIG. 7 is a flowchart 700 illustrating inferring a product weight using an ML model, according to one embodiment. In an embodiment, a processing service 720 (e.g., the prediction validation service 212 illustrated in FIG. 2 or any other suitable software service) is associated with a product weight prediction ML model 610. In an embodiment, the product weight prediction ML model 610 is trained to infer a predicted weight 730 for one or more identifies products 702. For example, product weight prediction ML model 610 can predict a total weight for products for purchase, as discussed above in relation to FIGS. 3-5.

In an embodiment, the predicted weight 730 reflects a predicted weight for the identified products 702. Alternatively, or in addition, the predicted weight 730 identifies multiple suggested matches (e.g., a range of predicted weights). In an embodiment, the product weight prediction ML model 610 provides confidence scores for possible predicted weights 730, which can be factored in to the weight deviation calculated at block 504 in FIG. 5, above.

Figure 8:
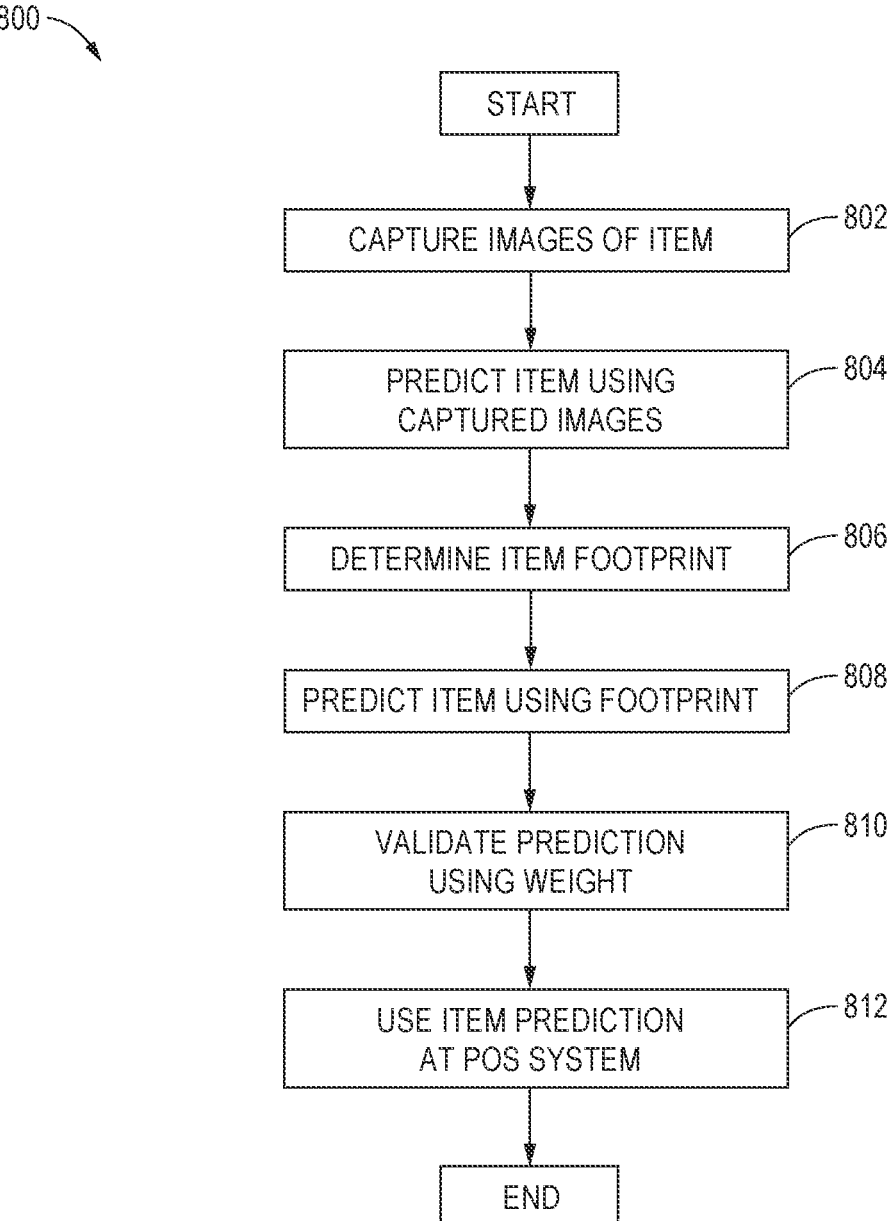
FIG. 8 is a flowchart illustrating POS item prediction using weight and item footprint, according to one embodiment.

FIG. 8 is a flowchart 800 illustrating POS item prediction using weight and item footprint, according to one embodiment. At block 802, a prediction validation service (e.g., the prediction validation service 212 illustrated in FIG. 2 or any other suitable software service) captures images of an item for purchase. For example, a POS kiosk (e.g., the POS kiosk 150 illustrated in FIG. 1B) can include one or more image capture devices (e.g., cameras) to capture images of items for purchase.

At block 804, the prediction validation service predict the item using captured images. As discussed above in relation to block 302 illustrated in FIG. 3, the prediction validation service can use computer vision techniques (e.g., a suitable ML model) to predict items depicted in images. In an embodiment, the prediction validation service identifies items visible in the captured images. Alternatively, or in addition, the prediction validation service may not be able to distinguish between items that appear visually similar. For example, the purchase may be purchasing a can of soda available in different sizes. The prediction validation service may be able to identify the brand and type of soda, but may not be able to distinguish between the available sizes of the soda can. The prediction validation service can predict multiple options for the item (e.g., the available sizes of soda cans for the item).

At block 806, the prediction validation service determines an item footprint. In an embodiment, the POS kiosk includes pressure or weight sensors that can be used to identify pressure points of the item resting on a pad at the POS kiosk. This can be used to determine a footprint for the item, as it rests on the pad. In an embodiment, a suitable ML model can be used to infer an item footprint, an item prediction, or both, from the pressure or weight measurements of the POS kiosk. For example, the ML model can be trained using measured pressure or weight data for a variety of items and item footprints. The trained ML model can then be used to infer an item footprint, prediction, or both, from measured pressure or weight data.

At block 808, the prediction validation service predicts the item using the footprint. In an embodiment, the prediction validation service compares the item shape shown from above (e.g., as captured in images by the POS kiosk) with the item shape from below (e.g., in the item footprint captured using pressure or weight sensors). For example, the prediction validation service can use intersection over union (IoU) to validate or change the item prediction (e.g., determined at block 804 using the captured images) by comparing the two perspective of the item (e.g., the top perspective identified from captured images and the footprint captured from pressure or weight sensors). In an embodiment, IoU is an object detection technique that can be used to validate a prediction. Use of IoU is merely one example, and any suitable technique can be used. Further, the prediction validation service can use the footprint to select between predicted item options (e.g., sizes of soda cans, as discussed above in relation to block 804) from on the images. That is, computer vision techniques can be used to identify a set of predicted items from captured images, and the item footprint can be used to select among that set of predicted items.

At block 810, the prediction validation service validates the prediction using weight. In an embodiment, the weight of the items for purchase can be used to further validate the prediction. For example, as discussed above in relation to FIGS. 3-7, the weight of items for purchase can be used to validate an image-based prediction of items for purchase (e.g., where one or more items are not visible in captured images). These techniques discussed above in relation to FIGS. 3-7 can further be used to validate the predicted item based on the footprint, determined at block 808. While FIG. 8 illustrates using weight and footprint for prediction, this is merely an example. In an embodiment, the prediction validation service can use footprint data (e.g., as discussed in relation to block 808), weight data (e.g., as discussed above in relation to FIGS. 3-7), or any combination thereof.

Further, in an embodiment, the prediction validation service can use changes in footprint, weight, or both, over time. For example, the POS kiosk can record changes in item footprint and weight over time. The prediction validation service can record historical values for item footprint, weight, or both, and use those historical values and changes in the item prediction and validation. For example, historical values for weight or footprint can be used to identify a state of the POS kiosk (e.g., a state of purchasing items) and to predict appropriate actions or interventions based on the state.

At block 812, the prediction validation service uses the item prediction at the POS system. For example, the prediction validation service can present the predicted item to the purchaser (e.g., using a display of the POS kiosk). The purchase can then determine whether the prediction is correct, and whether to proceed with the transaction. As another example, the prediction validation service can use the prediction to validate a prior selection by the purchaser, or another prediction (e.g., a solely image based prediction), and to determine whether to continue a transaction or intervene in the transaction. This is discussed above, in relation to blocks 310 and 312 illustrated in FIG. 3.

Figure 9:
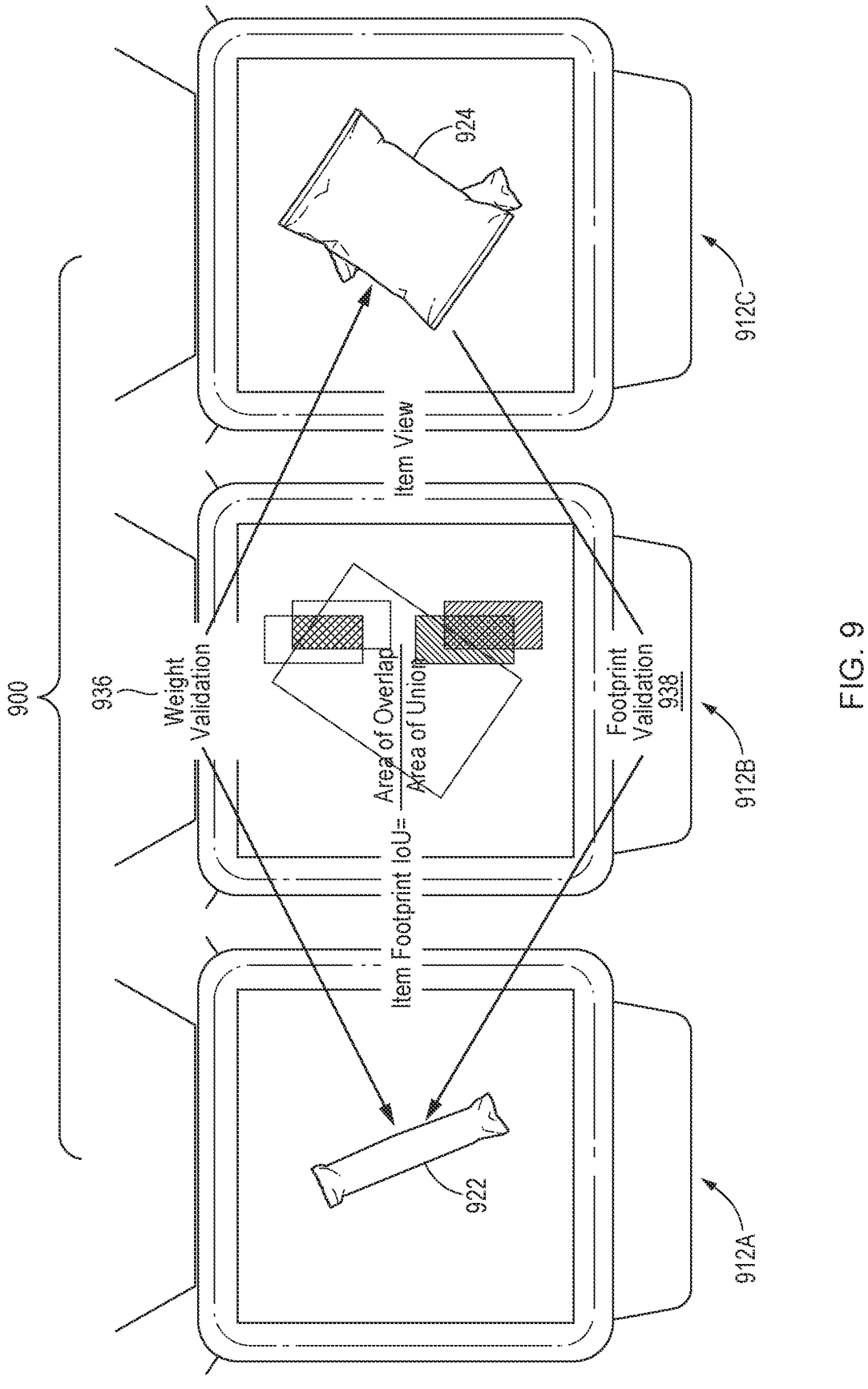
FIG. 9 illustrates use of a kiosk for POS item prediction using weight and item footprint, according to one embodiment.

FIG. 9 illustrates use of a kiosk for POS item prediction using weight and item footprint, according to one embodiment. Like FIG. 4, above, a POS kiosk 900 is used to purchase two items: a snack bag 924 and a candy bar 922. The POS kiosk 900 includes image capture devices and a pad (e.g., as illustrated in FIG. 1B). The items are placed on the POS kiosk pad such that the candy bar 922 (shown in a view 912B) is placed underneath the snack bag 924, and cannot be seen in images captured by image capture devices at POS kiosk. This is illustrated in a view 912C.

In an embodiment, a prediction validation service (e.g., the prediction validation service 212 illustrated in FIG. 2 or any other suitable service) follows the techniques illustrated above in relation to FIG. 8, and uses footprint data, weight data, or both, to predict and validate items for purchase. For example, the POS kiosk 900 can measure a footprint for the items for purchase (e.g., using pressure or weight sensors) and a weight. The prediction validation service can determine a footprint validation 938 by comparing a top-down shape for the items (e.g., based on captured images) with the bottom-up footprint (e.g., captured using pressure or weight sensors) to predict the item (e.g., using IoU). Further, the prediction validation service can determine a weight validation 936 using the measured weight of the items for purchase. The prediction validation service can predict items for purchase, or validate a prior prediction, using the footprint validation 938 and weight validation 936. For example, the prediction validation service can present the predicted items on a display of the POS kiosk 900, or can take a suitable intervention action.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

Aspects of the disclosed embodiments may take the form of an entirely hardware embodiment, an entirely software embodiment (including firmware, resident software, micro-code, etc.) or an embodiment combining software and hardware aspects that may generally be referred to herein as a "circuit," "module" or "system."

The disclosed embodiments may be a system, a method, and/or a computer program product. The computer program product may include a computer readable storage medium (or media) having computer readable program instructions thereon for causing a processor to carry out aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a por-table compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may com-prise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming lan-guages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, elec-tronic circuitry including, for example, programmable logic circuitry, field-programmable gate arrays (FPGA), or pro-grammable logic arrays (PLA) may execute the computer readable program instructions by utilizing state information of the computer readable program instructions to personalize the electronic circuitry, in order to perform aspects of the disclosed embodiments.

Aspects of the disclosed embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be imple-mented by computer readable program instructions.

These computer readable program instructions may be provided to a processor of a general purpose computer, special purpose computer, or other programmable data pro-cessing apparatus to produce a machine, such that the instructions, which execute via the processor of the com-puter or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a certain manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing apparatus, or other device to cause a series of operational steps to be performed on the computer, other programmable apparatus or other device to produce a computer imple-mented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the function-ality involved. It will also be noted that each block of the block diagrams and/or flowchart illustration, and combina-tions of blocks in the block diagrams and/or flowchart illustration, can be implemented by special purpose hardware-based systems that perform the specified functions or acts or carry out combinations of special purpose hardware and computer instructions.

While the foregoing is directed to embodiments, other and further embodiments may be devised without departing from the basic scope thereof, and the scope thereof is determined by the claims that follow.

What is claimed is:

1. A method comprising:
identifying one or more images, captured at a point of sale (POS) system, of one or more items for purchase;
identifying a measured characteristic of the one or more items for purchase, the measured characteristic comprising: (i) a first weight measured using a weight sensor associated with the POS system and (ii) a footprint measured using one or more pressure or weight sensors associated with the POS system;
causing a preprocessing operation to execute on the identified first weight and the footprint;
responsive to causing the preprocessing operation to execute, (i) generating a first feature vector associated with the first weight and a second feature vector associated with the footprint, (ii) generating a ML model data stream, wherein the ML model data stream comprises the first and second feature vectors, and (iii) training a ML model using the ML vector data stream;
responsive to training the ML model using the ML vector data stream, predicting the items for purchase; and
validating the predicted items for purchase using the measured characteristic.

2. The method of claim 1, wherein the measured characteristic comprises the first weight, the method further comprising:
predicting a second weight for the one or more items based on providing the predicted items for purchase to a second ML model.

3. The method of claim 2, wherein validating the predicted items for purchase using the measured characteristic comprises:
calculating a weight deviation between the measured first weight for the one or more items for purchase and the predicted second weight for the one or more items for purchase.

4. The method of claim 3, wherein validating the predicted items for purchase using the measured characteristic further comprises:
determining the weight deviation falls within a deviation threshold.

5. The method of claim 4, wherein the weight deviation is calculated according to the formula:

$$|(\text{measured weight} - \text{predicted weight})| \div |(\text{expected weight}) \div \text{predicted number of items}.$$

6. The method of claim 1, wherein the measured characteristic comprises the footprint measured using one or more pressure or weight sensors associated with the POS system, the method further comprising:
identifying a top-down shape of the one or more items for purchase based on the identified one or more images; and
comparing the top-down shape of the one or more items with the footprint for the one or more items.

7. The method of claim 6, wherein the comparing the top-down shape with the footprint for the one or more items comprises determining an intersection over union (IoU) for the top-down shape compared with the footprint for the one or more items.

8. The method of claim 1,
wherein the measured characteristic comprises both the first weight measured using a weight sensor associated with the POS system and the footprint measured using one or more pressure or weight sensors associated with the POS system, and
wherein validating the predicted items for purchase using the measured characteristic is based on both the first weight and the footprint.

9. The method of claim 1, wherein validating the prediction of the one or more items for purchase comprises:
determining that a transaction for purchasing the one or more items should not be validated; and
intervening in the transaction.

10. The method of claim 9, wherein intervening in the transaction comprises:
modifying a user interface associated with the POS system to indicate that items should be moved at the POS system.

11. A non-transitory computer program product comprising:
one or more non-transitory computer readable media containing, in any combination, computer program code that, when executed by operation of any combination of one or more processors, performs operations comprising:
identifying one or more images, captured at a point of sale (POS) system, of one or more items for purchase;
identifying a measured characteristic of the one or more items for purchase, the measured characteristic comprising: (i) a first weight measured using a weight sensor associated with the POS system and (ii) a footprint measured using one or more pressure or weight sensors associated with the POS system;
causing a preprocessing operation to execute on the identified first weight and the footprint;
responsive to causing the preprocessing operation to execute, (i) generating a first feature vector associated with the first weight and a second feature vector associated with the footprint, (ii) generating a ML model data stream, wherein the ML model data stream comprises the first and second feature vectors, and (iii) training a ML model using the ML vector data stream;
responsive to training the ML model using the ML vector data stream, predicting the items for purchase; and
validating the predicted items for purchase using the measured characteristic.

12. The non-transitory computer program product of claim 11, wherein the measured characteristic comprises the first weight, the operations further comprising:
predicting a second weight for the one or more items based on providing the predicted items for purchase to a second ML model.

13. The non-transitory computer program product of claim 12, wherein validating the predicted items for purchase using the measured characteristic comprises:
calculating a weight deviation between the measured first weight for the one or more items for purchase and the predicted second weight for the one or more items for purchase; and determining the weight deviation falls within a deviation threshold.

14. The non-transitory computer program product of claim 11, wherein the measured characteristic comprises the footprint measured using one or more pressure or weight sensors associated with the POS system, the operations further comprising:

identifying a top-down shape of the one or more items for purchase based on the identified one or more images; and comparing the top-down shape of the one or more items with the footprint for the one or more items.

15. The non-transitory computer program product of claim 11, wherein the measured characteristic comprises both the first weight measured using a weight sensor associated with the POS system and the footprint measured using one or more pressure or weight sensors associated with the POS system, and wherein validating the predicted items for purchase using the measured characteristic is based on both the first weight and the footprint.

16. A system, comprising:

one or more processors; and one or more memories storing a program, which, when executed on any combination of the one or more processors, performs operations, the operations comprising:

identifying one or more images, captured at a point of sale (POS) system, of one or more items for purchase;

identifying a measured characteristic of the one or more items for purchase, the measured characteristic comprising: (i) a first weight measured using a weight sensor associated with the POS system and (ii) a footprint measured using one or more pressure or weight sensors associated with the POS system;

causing a preprocessing operation to execute on the identified first weight and the footprint;

responsive to causing the preprocessing operation to execute, (i) generating a first feature vector associated with the first weight and a second feature vector associated with the footprint, (ii) generating a ML model data stream, wherein the ML model data stream comprises the first and second feature vectors, and (iii) training a ML model using the ML vector data stream;

responsive to training the ML model using the ML vector data stream, predicting the items for purchase; and validating the predicted items for purchase using the measured characteristic.

17. The system of claim 16, wherein the measured characteristic comprises the first weight, the operations further comprising:

predicting a second weight for the one or more items based on providing the predicted items for purchase to a second ML model.

18. The system of claim 17, wherein validating the predicted items for purchase using the measured characteristic comprises:

calculating a weight deviation between the measured first weight for the one or more items for purchase and the predicted second weight for the one or more items for purchase; and determining the weight deviation falls within a deviation threshold.

19. The system of claim 16, wherein the measured characteristic comprises the footprint measured using one or more pressure or weight sensors associated with the POS system, the operations further comprising:

identifying a top-down shape of the one or more items for purchase based on the identified one or more images; and comparing the top-down shape of the one or more items with the footprint for the one or more items.

20. The system of claim 16, wherein the measured characteristic comprises both the first weight measured using a weight sensor associated with the POS system and the footprint measured using one or more pressure or weight sensors associated with the POS system, and wherein validating the predicted items for purchase using the measured characteristic is based on both the first weight and the footprint.

* * * * *